United States Patent
Lüchinger

(10) Patent No.: US 8,551,421 B2
(45) Date of Patent: Oct. 8, 2013

(54) LABORATORY INSTRUMENT FOR THE PREPARATION OF SAMPLES

(75) Inventor: Paul Lüchinger, Uster (CH)

(73) Assignee: Mettler-Toledo AG, Greifensee (CH)

( * ) Notice: Subject to any disclaimer, the term of this patent is extended or adjusted under 35 U.S.C. 154(b) by 25 days.

(21) Appl. No.: 13/106,698

(22) Filed: May 12, 2011

(65) Prior Publication Data

US 2011/0286886 A1 Nov. 24, 2011

(30) Foreign Application Priority Data

May 20, 2010 (EP) ..................................... 10163365

(51) Int. Cl.
*G01G 21/28* (2006.01)
*G01G 21/22* (2006.01)
*B01L 1/00* (2006.01)

(52) U.S. Cl.
USPC ............. 422/500; 422/509; 422/521; 422/64; 177/50; 177/181; 222/77; 141/83; 73/863.01

(58) Field of Classification Search
None
See application file for complete search history.

(56) References Cited

U.S. PATENT DOCUMENTS

| 4,224,032 | A | * | 9/1980 | Glover et al. .................... 436/46 |
| 5,187,976 | A | | 2/1993 | Gossler et al. |
| 5,398,556 | A | | 3/1995 | Lang |
| 5,606,153 | A | | 2/1997 | Fix, Sr. et al. |
| 6,457,496 | B1 | * | 10/2002 | Chuang ........................... 141/83 |
| 7,617,849 | B2 | | 11/2009 | Dubois et al. |
| 2004/0175295 | A1 | | 9/2004 | Garcia |
| 2008/0190513 | A1 | | 8/2008 | Luechinger et al. |

FOREIGN PATENT DOCUMENTS

| AU | 2008200146 A1 | 7/2009 |
| DE | 102007006553 A1 | 8/2008 |

* cited by examiner

*Primary Examiner* — P. Kathryn Wright
(74) *Attorney, Agent, or Firm* — Standley Law Group LLP

(57) ABSTRACT

A laboratory instrument for the preparation of samples includes a base housing with a work compartment enclosed by protective walls, at least one multifunctional work head having the ability to turn about a rotary axis pivotally supported on the base housing. At least two defined functional positions that can be aligned with at least one container platform which is arranged in the work compartment. The first functional position contains a receiving device which serves to hold a dosage-dispensing device with free-flowing dosage material, and each of the other functional positions contains an additional device. At least one of the protective walls has a cutout opening, and the at least one multifunctional work head is arranged partially in the cutout, so that portions of the at least one multifunctional work head lies both inside and outside of the work compartment.

17 Claims, 5 Drawing Sheets

LABORATORY INSTRUMENT FOR THE PREPARATION OF SAMPLES

CROSS-REFERENCE TO RELATED APPLICATIONS

This application is entitled to, and claims, benefit of a right of priority under 35 USC §119 from European patent application 10163365.9, filed on May 20, 2010, the content of which is incorporated by reference as if fully recited herein.

TECHNICAL FIELD

Exemplary embodiments of the present invention concern a laboratory instrument for the preparation of samples.

BACKGROUND

In the process of analyzing substances and materials in the laboratory, an essential step is the preparation of the sample. This preparatory step is often very time-consuming and expensive, as several samples normally have to be prepared for the analysis of a substance in order to validate the measurement results. In most cases, up to a dozen samples of a given substance have to be weighed into target containers, a solvent has to be added, and the target containers have to be closed up.

To a growing extent, the preparation of samples is being automated in order to shorten the preparation time and to prevent the possibility of errors of the kind that can occur in a manual preparation. Most automated sample preparation systems involve the use of a base platform with individual processing stations and a tri-axial robot system. A multifunctional laboratory instrument of this type is disclosed for example in EP 1 674 393 B1. However, these laboratory instruments have the disadvantage that they require a relatively large work area in comparison to a laboratory balance which is normally used for the manual preparation of samples. If the substances to be processed are toxic, the laboratory balance is set up in a work compartment with an exhaust device and the sample preparation is carried out inside this compartment. However, the aforementioned robot systems are in most cases too big and therefore have their own protective compartment which encloses the entire system. Accordingly, these multifunctional systems cost a multiple of the price of a laboratory balance. Furthermore, due to the size of the working space alone that is enclosed in the protective compartment, the cleaning of these systems involves a significant effort, and if only a small number of samples have to be prepared, the automated sample preparation is therefore still not being used. In contrast, the work compartment of a laboratory balance which is enclosed by the draft shield of the balance can be cleaned quickly and easily.

To alleviate the need for a large amount of working space, the state of the art offers compact laboratory instruments as disclosed for example in EP 1 959 244 A1, FIGS. 7 and 8. A side-by-side arrangement of several dosage-dispensing devices provides a simple way to prepare powder mixtures automatically. Nevertheless, these laboratory instruments, too, require a large working area in comparison to a balance if they are to be enclosed by a work compartment. Furthermore, cleaning of the laboratory instruments arranged in the work compartment is still a big undertaking.

SUMMARY OF THE INVENTIVE CONCEPT

It is therefore the object of exemplary embodiments of the present invention to create a laboratory instrument for the preparation of samples of the kind described above, whose work compartment is kept as small as possible.

This task is solved with exemplary laboratory instruments having features described and claimed herein.

A laboratory instrument for the preparation of samples comprises a base housing with a work compartment enclosed by protective walls as well as at least one multifunctional work head that is pivotally supported on the base housing with the ability to turn about a rotary axis. This work head has at least two defined functional positions, wherein by way of turning the multifunctional work head, each of these functional positions can be aligned with at least one container platform which is arranged in the work compartment. A target container can be placed on the container platform, whereupon a sample is filled into the target container and prepared. The first functional position contains a receiving device which serves to hold a dosage-dispensing device with free-flowing dosage material, and each of the other functional positions contains a further device. The further devices can be further receiving devices as described hereinafter, but also devices with different functions. At least one of the protective walls has a cutout opening, and the at least one multifunctional work head is arranged partially in the cutout, so that a part of the multifunctional work head lies outside the work compartment and the other part of the multifunctional work head lies inside the work compartment. Depending on the layout of the multifunctional work head, the latter can be turned by a full 360° or only by a part of a full revolution.

This arrangement makes it possible to design the work compartment with very compact dimensions, as a result of which the cleaning activities are confined to this small space. Furthermore, a part of the multifunctional work head is always located outside of the work compartment, so that the functional position that lies in this part is accessible. For example, if there are two receiving devices at the functional positions, the receiving device currently located outside of the work compartment can be loaded with a new dosage-dispensing device, while dosage material is being dispensed into the target container from the dosage-dispensing device installed in the other receiving device currently located inside the work compartment.

There can further be a weighing cell arranged in the base housing, in which case at least one container platform is tied to the weighing cell through a force-transmitting connection. Particularly in this exemplary embodiment of the present invention, the design layout offers enormous advantages, as the work compartment has a very small volume and consequently, the air enclosed inside this space quickly looses its kinetic energy if it has been stirred up by disturbances in the work compartment. This can occur for example when a target container is set in place or removed. The rotary movement of the multifunctional work head likewise causes an extraordinarily small amount of air movements, as there should hardly be any parts protruding from the work head during the rotation and thereby stirring up the air mass in the work compartment.

Further, as mentioned above, the multifunctional work head can be loaded during operation, e.g. while the preparation of a sample is in process, without the need to open the work compartment. As the loading operations take place outside of the work compartment, they also do not stir up the air in the work compartment. Thus, as the exemplary embodiment creates optimal conditions in the work compartment, it is possible to use high-resolution weighing cells whereby the quantities dispensed into the target container can be measured and transmitted to the controller of the dosage-dispensing device almost in real time. The term "high-resolution weighing cells" refers to devices which allow the mass of a weighing object to be measured with an accuracy as fine as a microgram.

Of course, it is also possible to arrange several weighing cells in the base housing, wherein each weighing cell is connected to a container platform. It is likewise self-evident that several multifunctional work heads could be arranged on the base housing.

The spatial arrangement of the axis of rotation of the at least one multifunctional work head can be arbitrarily chosen. However, a horizontal or vertical arrangement is preferred.

It is not an absolute requirement that the cutout be formed only in one of the protective walls. Depending on the number of functional positions, and thus depending on the size of the multifunctional work head, the at least one cutout can extend into at least two adjacent protective walls.

If the laboratory instrument is to be loaded automatically with target containers, exemplary embodiments of the multifunctional work head can be designed so that at least part of the cutout opening can be set free by linearly sliding or by pivoting the work head out of the way. Through the opened-up cutout, a gripper of a laboratory robot can reach the container platform of the laboratory instrument without the need to open one of the protective walls.

However, to allow a partial opening of the cutout, the multifunctional work head does not necessarily have to be configured with the ability to slide or pivot. As an alternative possibility, the multifunctional work head can also include a further functional position in the form of an access clearance. To open up the cutout, the access clearance is brought into the appropriate position, so that a gripper of a laboratory robot can reach through the access clearance into the work compartment.

Other Exemplary embodiments of the multifunctional work head can further have a first plane and at least a second plane which are arranged orthogonal to the axis of rotation. At least one first functional position on the multifunctional work head is formed in the first plane, and a further functional position is formed in the at least second plane. With a linear move of the multifunctional work head along its axis of rotation, both the first and the second plane can be brought into alignment with the container platform. It is also conceivable that the multifunctional work head is subdivided into several sections, wherein each section contains one of the planes and the individual sections are rotatable independently of each other about the common axis of rotation.

Of course, it is also possible to design one or more of the protective walls with the ability to slide or swivel relative to the base housing, so that the work compartment can be accessed by opening the protective walls.

As is evident from the preceding explanation, during most of the operating functions the multifunctional work head closes off the cutout, and thus the work compartment, against the ambient environment of the laboratory instrument. Thus, the multifunctional work head is not only an exchanging device or a process head with a plurality of functions, but simultaneously forms a part of the protective walls. In order to achieve an even tighter closure of the work compartment, there can be a sealing device arranged in the area of the cutout. This sealing arrangement preferably seals all of the gaps, access clearances and crevices which, of necessity, are present between the protective wall and the multifunctional work head.

The sealing device can be an elastic sealing strip, sealing brush or sealing roller arranged between the protective wall and the multifunctional work head.

Alternatively, the sealing device can also be constituted by a bonnet or lid which covers up the cutout and spans over the part of the multifunctional work head which lies outside of the work compartment. Of course, combinations of the two sealing concepts are likewise conceivable.

Further, there can be a cleaning device arranged in the area of the sealing device for the cleaning of the multifunctional work head and/or of the sealing device. This cleaning device can for example be a vacuum-suction device, or a vacuum-suction device in combination with blast nozzles, or rotating brushes and the like.

During a change between functional positions, i.e. during a turn of the multifunctional work head, in order to minimize the gap between the multifunctional work head and the protective wall or to always keep the sealing device lying against the multifunctional work head, the latter can be given the basic shape of a cylindrical drum. This is particularly advantageous in cases where very fine, pulverous, dry, toxic substances have to be dispensed which, while they may contaminate the work compartment, cannot be allowed to escape into the ambient environment. Of course, exemplary embodiments of the multifunctional work head can also have any other cross-sectional shape desired, but it should preferably be designed to allow the multifunctional work head to turn a full 360° within the cutout.

The further functional positions of a multifunctional work head can carry a multitude of widely different devices, for example a further receiving device for a dosage-dispensing device, an electro-optical unit to identify and/or to position a target container on the container platform, a device to remove or put on the closure seal of a target container, a gripper serving to grip objects, a dosage-dispensing device for liquids, a receiving device for a dosage-dispensing device for liquids, or at least the outlet opening of a dosage-dispensing device for liquids, a sensor serving to detect electrostatic charges, an ionizer, an identification device, a distance sensor, or a cleaning device. The further functional positions of the multifunctional work head and the further devices preferably have a standardized mechanical and electrical interface. This facilitates the customizing of the multifunctional work head with user-specified functional modules.

Some of the functional positions can carry devices which repeatedly dispense larger quantities of a dosage material, for example a solvent, into the target container. To supply these devices with dosage material, the multifunctional work head can have a connector socket for a supply conduit or an exchangeable source container.

To prevent dosage material from getting spilled, the discharge orifice of the dosage dispensing device should be located directly above the fill opening of the target container during the dispensing process. As long as target containers of equal height are being used, the distance between the container platform and the multifunctional work head can be kept at a fixed setting. Preferably however, an exemplary embodiment of the multifunctional work head is arranged on the base housing in such a way as to be vertically adjustable in relation to the container platform, so that target containers of different heights can be set on the container platform.

Furthermore, in another exemplary embodiment the at least one protective wall with the cutout can be designed to be vertically movable together with the multifunctional work head. Of course, other protective walls without a cutout can likewise be movable together with the multifunctional work head. As a result of the protective walls being adjustable in their positions, the volume of the work compartment can be matched to the container height, so that the work compartment can always be kept at the minimum required volume.

Accordingly, the weighing cell can deliver a stable weight value more rapidly for small target containers, so that very small quantities can be measured out with high precision. Possibly, the resolution of the weighing cell, i.e. its ability to reliably discriminate between measurement values that are very close to each other, can be controlled as a function of the volume of the work compartment in order to maintain as much as possible the short response time for acquiring the measurement value.

BRIEF DESCRIPTION OF THE DRAWINGS

In addition to the features mentioned above, other aspects of the exemplary laboratory instruments with the arrangement of the multifunctional work head according to the inventive concept will hereinafter be explained in more detail through examples and with reference to the drawings and likewise other aspects of the inventive concept will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
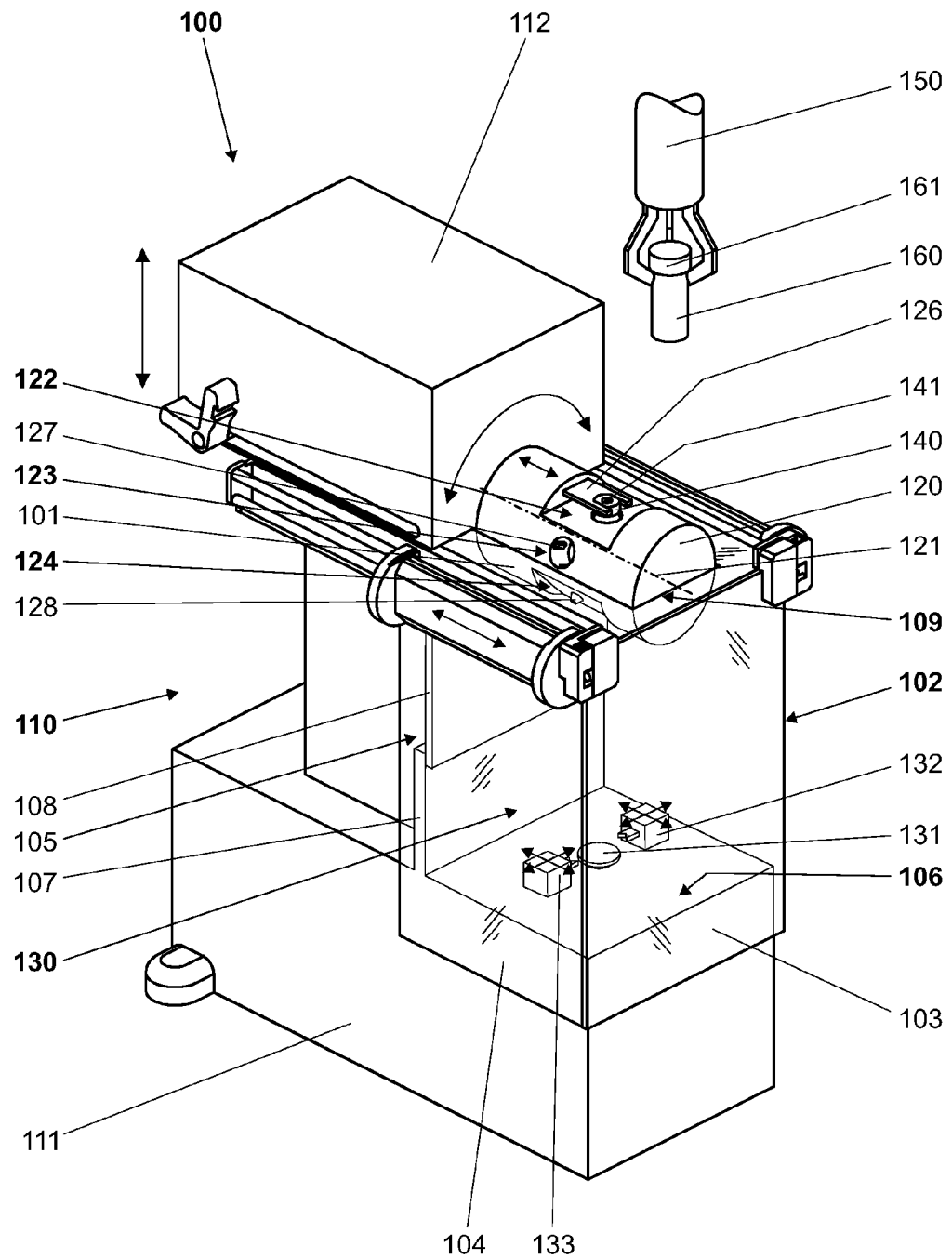
FIG. 1 illustrates a three-dimensional view of a first exemplary embodiment of a laboratory instrument with a work compartment enclosed by protective walls, as well as a multifunctional work head which is arranged in a cutout of a protective wall so as to be able to turn about a horizontal axis of rotation.

FIG. 1 illustrates a three-dimensional view of a first exemplary embodiment of a laboratory instrument 100 with a work compartment 130 enclosed by protective walls 101, 102, 103, 104, 105, 106. The laboratory instrument 100 includes a base housing 110 which is divided into an upper part 112 and a lower part 111. The upper part 112 can move relative to the lower part 111 along a linear vertical path. The lower part 111 is essentially a box-shaped enclosure in which a weighing cell (not shown) is arranged. A multifunctional work head 120 is pivotally supported on the upper part 112 with the ability to turn about a horizontal axis of rotation. Four of the protective walls 102, 103, 104, 105 extend in vertical planes, with two of the vertical walls being side walls 102, 104, a third being the front wall 103 and a fourth being the rear wall 105 of the work compartment 130. The two side walls 102, 104 are connected to the upper part 112 with the ability to slide in a linear horizontal path. The front wall 103 is releasably connected to the upper part 112. The rear wall 105 is made of two parts, with the first rear wall part 107 being permanently connected to the lower part 111 and the second rear wall part 108 being permanently connected to the upper part 112. Further, the two wear wall parts 107, 108 are arranged so that they partially overlap each other, which allows the upper part 112 to slide up and down relative to the lower part 111, while the work compartment 130 remains closed off from the ambient space for any position within the sliding range of the upper part 112 relative to the lower part 111.

The fifth protective wall 101 extends in a horizontal plane, is solidly connected to the upper part 112, and forms the ceiling 101 of the work compartment 130. Formed in the ceiling 101 is a cutout 109 which is closed off by the multifunctional work head 120, as the latter is arranged in the cutout 109 in accordance with the invention. A sixth protective wall of the work compartment 130 forms the floor 106 which also extends in a horizontal plane and which is solidly connected to the lower part 111. The transparent front wall 103 and side walls 102, 104 allow an open view into the work compartment 130. The container platform 131 arranged in the work compartment 130 has a load-transmitting connection to the weighing cell which is arranged inside the lower part 111. The front wall 103 and the two side walls 102, 104 are arranged so that they can slide down over the front and side walls of the box-shaped lower part 111, allowing unobstructed vertical movement of the upper part 112 relative to the lower part 111. The protective walls 102, 103, 104 are lying snug against the front and side walls of the box-shaped lower part 111, so that no air movements which may exist in the surrounding area can be transmitted into the work compartment 130 through excessively large leaks.

The multifunctional work head 120 has several functional positions 122, 123, 124 which are occupied by different devices. Only three of these functional positions 122, 123, 124 are visible. In the first functional position 122, a receiving device 126 is formed in which a dosage-dispensing device 140 is installed. This dosage-dispensing device 140 has an outlet opening 141 which can be closed by be a valve (not shown). The valve can be opened and closed by a drive mechanism which is likewise not shown in the drawing.

As shown in FIG. 1, the dosage-dispensing device 140 is located outside of the work compartment 130, with its outlet opening 141 oriented against the direction of gravity. As soon as dosage material is to be dispensed, the multifunctional work head 120 is turned over until the dosage-dispensing device 140 is inside the work compartment 130 and the outlet opening 141 is oriented in the direction of gravity, so that the pull of gravity can move dosage material out of the outlet opening. The turning of the multifunctional work head 120 can further serve to loosen up pulverous, coagulating dosage material in the dosage-dispensing device 140. If necessary, the work head 120 can be turned over several times or agitated with oscillatory turning movements and the like.

As is evident from the drawing, the dosage-dispensing device 140 can be inserted either manually or also by means of a robotic gripper 150 into the receiving device 126 of the multifunctional work head 120. For the robotic insertion, the robot and its gripper 150 remain outside the work compartment 130. To also allow target containers 160 to be set on the container platform 131 by means of the robotic gripper 150, the multifunctional work head 120 can slide in a linear path along its axis of rotation 121, so that when the multifunctional work head 120 is retracted into the upper part 112, the cutout 109 is set free. When target containers are set in place by the robot, the latter always remains outside the work compartment. Thus, only the robotic gripper 150 needs to be cleaned occasionally. Furthermore, with the exemplary multifunctional work head 120 arranged in accordance with the invention, the volume of the work compartment 130 can be kept at a minimum, so that the enclosed air mass in the work compartment 130 comes to rest in a short time and the weight values can be obtained quickly and precisely.

Besides the receiving device 126 in the first functional position 122, there is a lid opener device 127 arranged in the second functional position 123 and the outlet nozzle (not shown in the Figures) of a liquid-dispensing device 128 in the third functional position 124. To make it possible for the lid opener device 127 to open a closure seal, specifically a screw cap 161, of a target container 160, there are two clamping devices 132, 133 arranged in the work compartment 130 on both sides of the container platform 131 which serve to temporarily constrain the target container 160 to withstand the torque of the lid opener. The two clamping devices 132, 133 can be simultaneously movable in a horizontal plane, as indicated by the arrows. Thus, the target container 160 can not only be constrained, but it can also be precisely positioned by means of the clamping devices 132, 133. In the positioning of the target container 160, the camera, which will be described in the context of FIG. 3 can serve as an optical aid, as the image taken by the camera is transmitted to a display screen (not shown in the Figures) of the laboratory instruments 100 and the user is thereby guided in the process of moving the clamping devices 132, 133 into the correct position either manually or by means of a keyboard entry. Of course, the image of the camera can also be processed in a processor unit that is part of the laboratory instrument 100, and based on the data generated by the processor the positioning process can be performed automatically. Obviously, while the weighing is taking place, the clamping devices 132, 133 are completely separated from the target container 160, so that the weighing result is not influenced by the clamping devices 132, 133.

Figure 2:
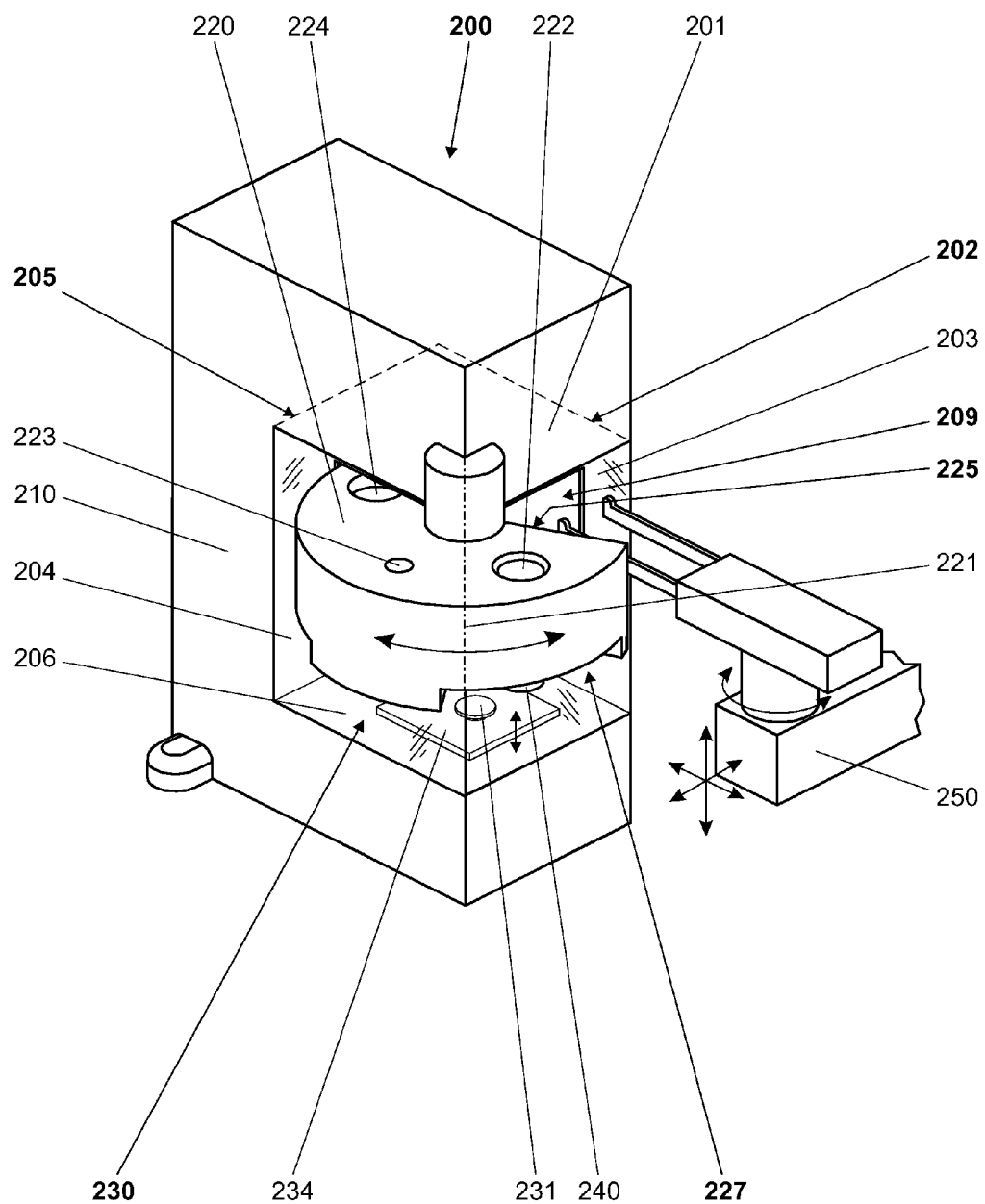
FIG. 2 illustrates a three-dimensional view of a second exemplary embodiments of a laboratory instrument with a work compartment enclosed by protective walls, as well as a multifunctional work head which is arranged in a cutout of two protective walls so as to be able to turn about a vertical axis of rotation.

FIG. 2 illustrates a three-dimensional view of a second exemplary embodiment of a laboratory instrument 200 with a work compartment 230 enclosed by protective walls 201, 202, 203, 204, 205, 206. The laboratory instrument has a C-shaped base housing 210, wherein three walls of the base housing 210 also are protective walls of the work compartment 230, namely the floor 206, rear wall 205, and ceiling 201. The further protective walls, i.e. the front wall 203 and the two side walls 202, 204 are made of transparent material, so that the activities taking place in the work compartment 230 can be observed. The cutout opening 209 in this laboratory instrument 200 extends over the one sidewall 204 and the front wall 203. Arranged in the cutout opening 209 is a multifunctional work head 220 whose rotary axis 221 is oriented in the vertical direction. This multifunctional work head 220, likewise, has several functional positions 222, 223, 224, and a further functional position in the form of an access clearance position 225 which serves to free up part of the cutout 209 so as to give free access for a robotic gripper 250 to reach into the work compartment 230. Of course, the protective walls 201, 202, 203, 204, 205, 206 do not have to be rigidly connected to the base housing 210 but could also be arranged on the latter with the freedom to slide along linear paths as shown in the embodiment of FIG. 1. The multifunctional work head 220 further has cutouts 227 at its underside, so that for example a dosage-dispensing device 240 can be inserted into, and removed from, the receiving device of the first functional position 222 from below.

Arranged in the base housing 210 is a weighing cell whose weighing cell housing 234 protrudes partially from the floor 206 and which can slide vertically up and down relative to the floor 206. With this arrangement, the distance between the multifunctional work head 220 and the container platform 231 can be adjusted to the height of a target container.

Figure 3:
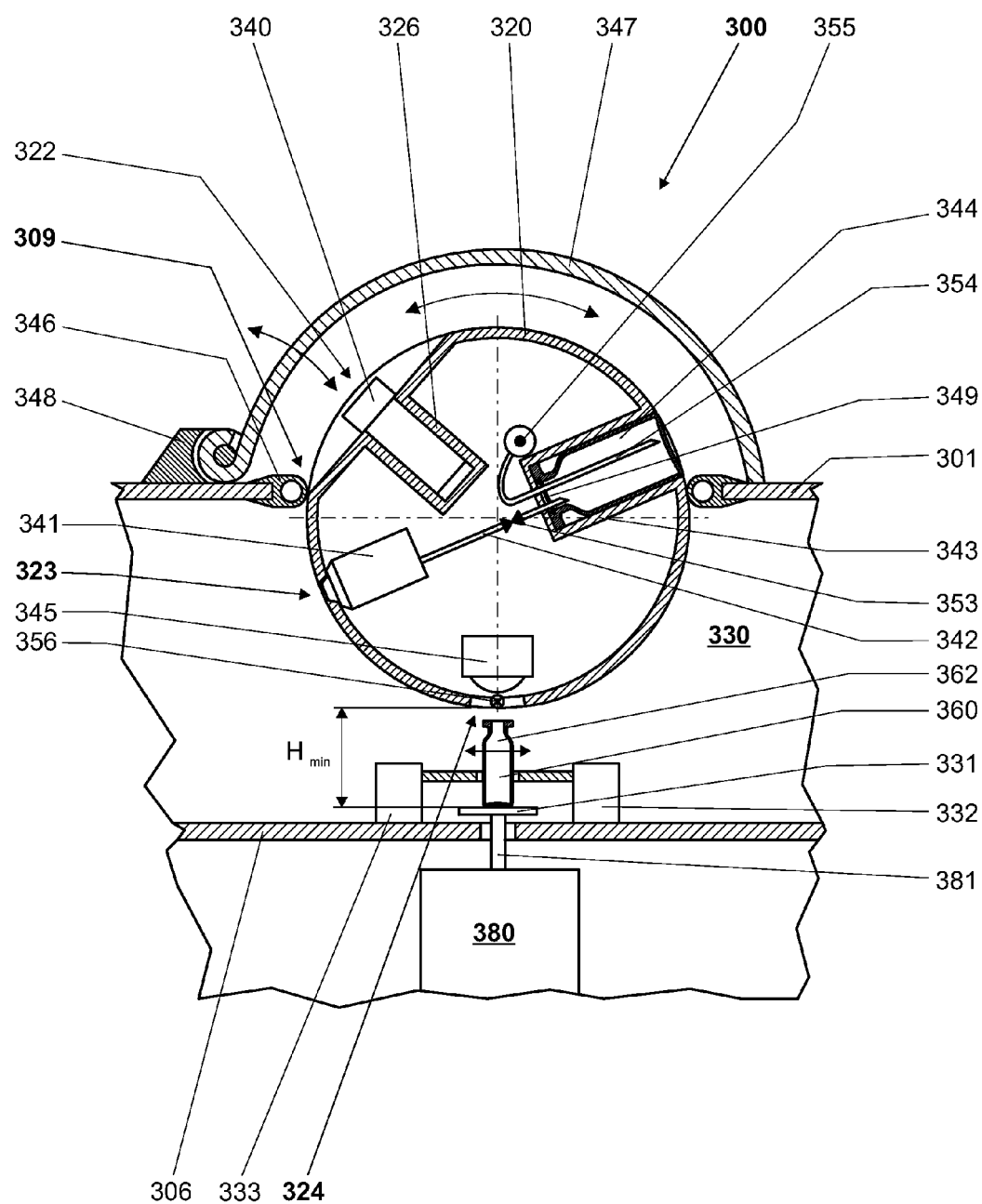
FIG. 3 illustrates a detail of an exemplary embodiment of an laboratory instrument similar to the exemplary embodiments shown in FIG. 1 in a sectional view, wherein a sealing device is arranged between the protective wall and the multifunctional work head, and wherein a further sealing device spans over the part of the multifunctional work head that lies outside of the work compartment.

In FIG. 3, a sectional view is shown of a detail of an exemplary laboratory instrument 300 which largely corresponds to the laboratory instrument 100 illustrated in FIG. 1, however with the difference that the functional positions 322, 323, 324 of the multifunctional work head 320 are occupied differently. In the first functional position 322, a receiving device 326 is arranged in which a dosage-dispensing device 340 is installed. The second functional position 323 is occupied by a dosage-dispensing head 341 for liquids which is supplied with a liquid through a connecting conduit 342. The connecting conduit 342 further includes a valve 353 which serves to control the quantity of liquid moving through the conduit 342. The end of the connecting conduit 342 has a sharp cutting edge and enters into a connector area 343 for a source container 344. As illustrated, the connector area 343 needs to be designed to accommodate the entire source container 344, because otherwise the multifunctional work head 320 could turn only within a limited range. Furthermore, a pressure conduit 354, which is connected to a pressurized gas source 355, likewise has a cutting edge and enters into the connector area 343. The source container 344 has a septum 349 which, as illustrated, can be punctured by means of the cutting edge in order to tap the contents of the source container 344. Obviously, the illustrated arrangement and location of these elements represents only one of many possible variations of connecting the source container 344 to the liquid-dispensing head 341. For example, one alternative consists of an arrangement where the connecting conduit 342 is routed through the base housing to the outside of the laboratory instrument 300 and connected to an external supply station.

The third functional position 324 is occupied by a camera 345, by means of which the position of a target container 360 on the container platform 331 can be adjusted, so that in the subsequent dosage-dispensing cycles, the discharge stream of dosage material will safely meet up with the fill opening 362 of the dosage container 360. Further, if the target container 360 carries a readable identification, it can be registered through the camera 345. Furthermore, the camera 345 allows the height of the target container 360 to be measured, so that the multifunctional work head 320 and the outlet opening 362 can be set at the minimum distance $H_{min}$ from each other. As a positioning aid, a laser diode 356 whose light beam is directed parallel to the axis of rotation can be arranged below the camera 345. By means of the light beam, the top edge of the target container 360 can be exactly identified, as the light beam illuminates the fill opening 362 as soon as the desired distance $H_{min}$ has been attained and this can be registered by the camera 345. In addition, the camera 345 can be used to check after the dispensing process whether the target container 360 was filled correctly or whether for example traces of the dosage material are clinging to the rim of the fill opening 362.

The rim of the cutout 309 which is formed in the ceiling 301 carries a sealing device in the form of a flexible sealing strip 346 which surrounds the multifunctional work head 320 and whose sealing contact surface bears with a slight pressure against the cylindrical wall of the multifunctional work head 320. The profile shape of the sealing strip 346 shown in the drawing represents only one of many possible shapes and is meant only as an example. If the purpose is that particles clinging to the cylinder wall are to be wiped off in the turning movement, other profile shapes with sharp edges, for example resembling windshield wiper blades, suggest themselves for the sealing strip 346. Furthermore, there is an additional sealing device in place in the form of a bonnet 347 which spans over the part of the multifunctional work head 320 that lies outside of the work compartment 330 and protects the multifunctional work head 320 from unwanted intrusions during certain operating phases of the laboratory instrument 300. The bonnet 347 is pivotally constrained along one side by means of a hinge 348 connected to the ceiling 301, so that it can be flipped out of the way in order to remove the dosage-dispensing device 340 from the receiving device 326 or to install a dosage-dispensing device 340 in the receiving device 326.

Below the floor 306, the drawing further shows a weighing cell 380 which has a load-transmitting connection to the container platform 331 in the form of a transmitting rod 381.

Clamping devices 333 and 332 can be used to constrain and precisely position the target container 360.

Figure 4:
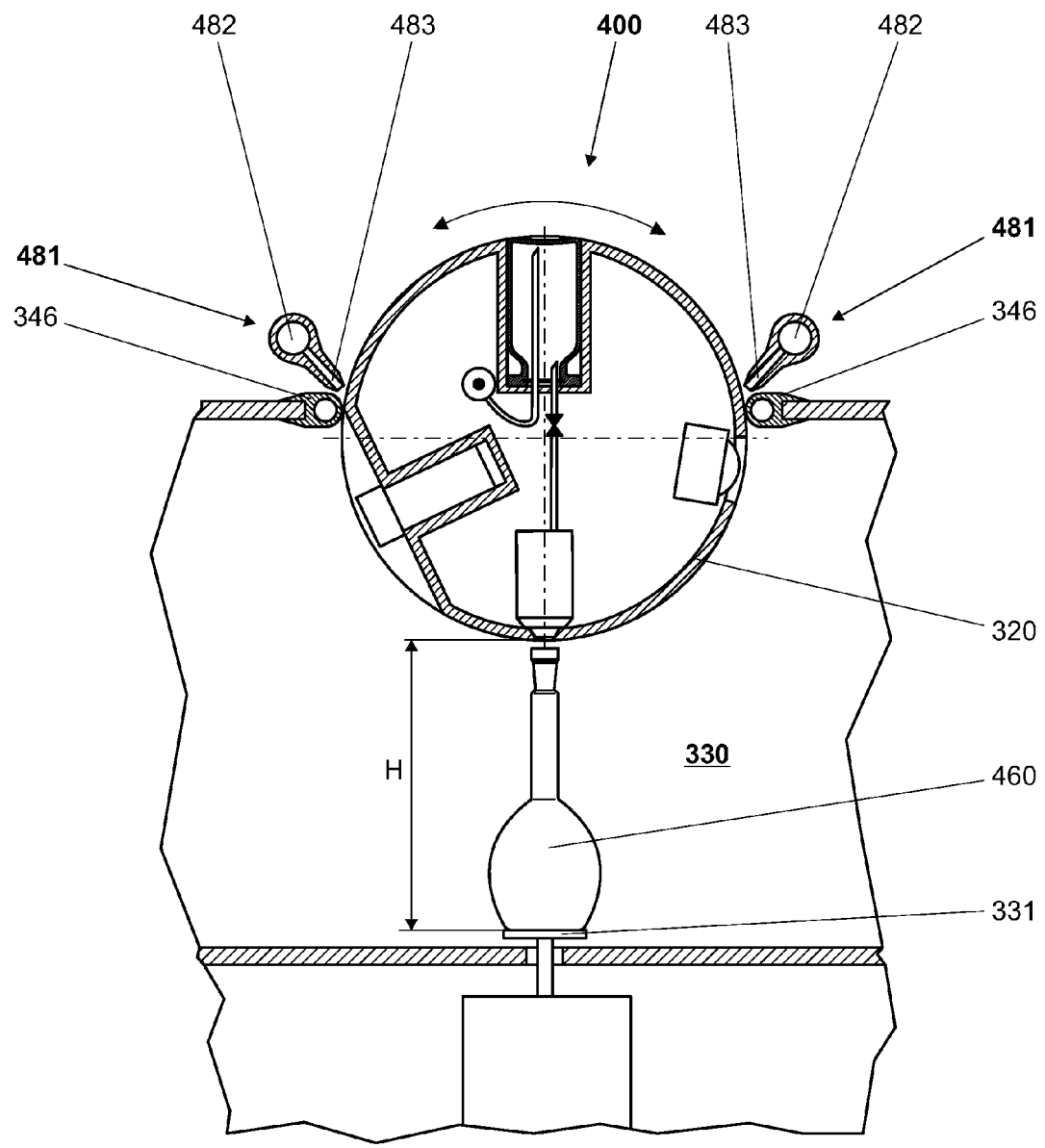
FIG. 4 illustrates a detail of an exemplary embodiment of a laboratory instrument similar to the exemplary embodiment shown in FIG. 1 in a sectional view, wherein a sealing device and a cleaning device are arranged between the protective wall and the multifunctional work head.

FIG. 4 illustrates a sectional view of an exemplary laboratory instrument 400, similar to the exemplary laboratory instrument 300 shown in FIG. 3, and to the extent that elements are identical, they therefore carry the same reference symbols. Instead of the bonnet shown in FIG. 3, the laboratory instrument 400 in FIG. 4 has a cleaning device 481. The cleaning device 481 has a vacuum suction channel 482 accompanying the sealing strip 346 around the rim of the cutout, with an intake slot 483 facing towards the sealing strip 346. The mouth of the intake slot 483 is arranged in the immediate vicinity of the contact line between the multifunctional work head 320 and the sealing strip 346. The vacuum suction channel 482 is connected to a vacuum suction device (not shown in the Figures) which continuously draws away the air in the area of the sealing strip 346 at least during the phase when the multifunctional work head 320 is turning. If residues of dosage material on the outside surface of the multifunctional work head 320, which are caught for example in recesses, are not wiped off by the sealing strip 346, they will be vacuumed off the multi-functional work head 320 by the cleaning device 481. Of course, the same also applies to contaminations such as dust particles which land on the multi-functional work head 320 from the outside and are vacuumed off the surface of the multi-functional work head 320 as it is turning into the work compartment 330.

The target container 460 standing on the container platform 331 has an elongated container body, which is why the distance H between the multifunctional work head 320 and the container platform 331 has been selected commensurately larger than in FIG. 3.

Figure 5:
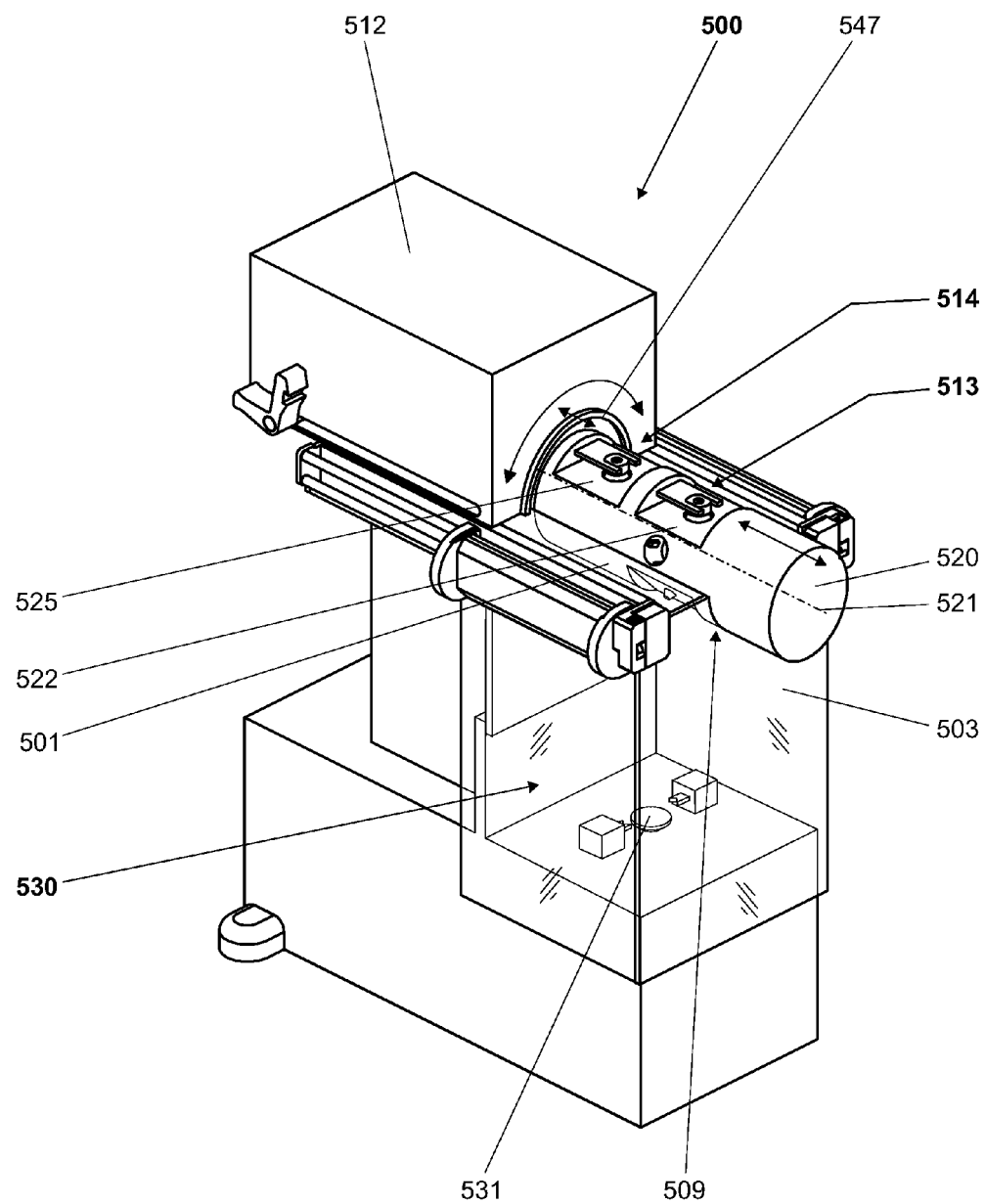
FIG. 5 illustrates an exemplary embodiment of a laboratory instrument similar to the exemplary embodiment shown in FIG. 1, except that the exemplary laboratory instrument of FIG. 5 has a multifunctional work head which is capable of linear movement, which extends beyond the work compartment, and which has functional positions arranged in two different planes.

FIG. 5 illustrates an exemplary laboratory instrument 500 similar to the exemplary laboratory instrument 100 illustrated in FIG. 1, with the difference that the laboratory instrument 500 in FIG. 5 has a multifunctional work head 520 capable of linear sliding movement, which extends beyond the work compartment 530. Accordingly, the cutout 509 extends not only through the entire ceiling 501 but also into a part of the front wall 503. As described already in the context of FIG. 1, the multifunctional work head 520 can be moved into any desired position along its rotary axis 521. This creates the possibility that the functional positions 522, 525 can be arranged in different planes 513, 514 which extend orthogonal to the rotary axis 521. The illustrated embodiment has a first plane 513 which contains the first functional position 522 and the further functional positions that were described already in the context of FIG. 1. In the second plane 514, which is arranged between the first plane 513 and the upper part 512, there is a fourth functional position 525 formed on the multifunctional work head 520. The first plane 513 as well as the second plane 514 can be brought into alignment with the container platform 531 through a linear position change of the multifunctional work head 520.

The laboratory instrument 500 further includes a bonnet 547 which does not flip open as in FIG. 3 but is designed to slide in a linear movement parallel to the multifunctional work head 520. The bonnet 547 in FIG. 5 is shown almost totally slid back into the upper part 512, for better visibility of the multifunctional work head 520. Of course, in the operation of the laboratory instrument 500, the bonnet 547 is retracted to expose only as much of the multifunctional work head 520 as is required for the process step to be performed.

While the invention has been described through the presentation of specific examples of embodiments, it is evident that numerous other variations of embodiments could be created once the present invention is known, for example configurations where the cleaning device is arranged in the work compartment or where the cleaning device is used in combination with the bonnet. Further, there can be several container platforms arranged in the work compartment, wherein all of the platforms together are connected to one weighing cell, or each platform has a load-transmitting connection to its own individual weighing cell. Embodiments of the laboratory instruments are also conceivable which have a plurality of multifunctional work heads reaching into the same work compartment. Obviously, additional features are possible for the dosage-dispensing device, the multifunctional work head, and for any device that can be connected to the multifunctional work head, for example identification means such as bar codes, matrix codes and/or radio-frequency-based identification means (RFID tags). There can also be connector ports for the introduction of protective gases into the work compartment, as well as bowls containing solvents serving to saturate the air inside the work compartment and thereby to prevent evaporation of the solvent dispensed into the target container.

What is claimed is:

1. A laboratory instrument, comprising:
a base housing, said base housing including:
    a work compartment enclosed by protective walls;
    at least one multifunctional work head having a rotary axis and at least two defined functional positions thereon, said at least one multifunctional work head pivotally supported on the base housing so as to turn about said rotary axis;
at least one cutout in at least one of said protective walls, said at least one multifunctional work head, having a first part and a second part, arranged in said at least one cutout so that at least one of said first part or said second part remain in said work compartment during rotation of said multifunctional work head;
an at least one container platform, said at least one container platform arranged in said work compartment, whereby turning the multifunctional work head each of the at least two defined functional positions can be aligned with at least one container;
a sealing device arranged in the area of the at least one cutout;
a receiving device residing in at least one functional position of said at least two defined functional positions; and
a dosage-dispensing device held by said receiving device having a free-flowing dosage material therein.

2. The laboratory instrument of claim 1, further comprising a weighing cell arranged in said base housing, said weighing cell tied to said at least one container platform through a force-transmitting connection.

3. The laboratory instrument of claim 1, wherein the rotary axis of the at least one multifunctional work head is oriented horizontally.

4. The laboratory instrument of claim 1, wherein the at least one cutout extends into at least two adjacent protective walls.

5. The laboratory instrument of claim 1, wherein the at least one multifunctional work head is capable of linear sliding movement and/or pivoting movement so as to set free at least part of an opening of the at least one cutout.

6. The laboratory instrument of claim 1, wherein at least one functional position of said at least one multifunctional work head has an access clearance serving to set free at least part of an opening of said at least one cutout.

7. The laboratory instrument of claim 1, wherein said at least one multifunctional work head is capable of linear sliding movement along the rotary axis and further comprises a first plane and at least one second plane, said planes are oriented orthogonal to said rotary axis, wherein at least one functional position is formed in the first plane and another at least one functional position is formed in the at least one second plane on the at least one multifunctional work head.

8. The laboratory instrument of claim 1, wherein said sealing device is arranged between said protective walls and the at least one multifunctional work head.

9. The laboratory instrument of claim 8, wherein said sealing device is an elastic sealing strip, sealing brush, or sealing roller.

10. The laboratory instrument of claim 8, wherein said sealing device completely covers the at least one cutout and spans over a portion of the at least one multifunctional work head which lies outside of the work compartment.

11. The laboratory instrument of claim 1, further comprising a cleaning device, said cleaning device in proximity to said sealing device, wherein said cleaning device serves to clean said at least one multifunctional work head and/or said sealing device.

12. The laboratory instrument of claim 1, wherein the at least one multifunctional work head has a cylindrical shape.

13. The laboratory instrument of claim 1, wherein at least one functional position of said at least two defined functional positions include a device, wherein said device is a receiving device for a dosage-dispensing device, an electro-optical unit to identify and/or to position a target container on said container platform, a device to remove or to put on a closure seal of a target container, a gripper serving to grip objects, a dosage-dispensing device for liquids, a receiving device for a dosage-dispensing device for liquids, at least the outlet opening of a dosage-dispensing device for liquids, a sensor serving to detect electrostatic charges, an ionizer, an identification device, a distance sensor, or a cleaning device.

14. The laboratory instrument of claim 1, wherein said at least one multifunctional work head comprises at least one connector for a source container or a connecting conduit.

15. The laboratory instrument of claim 1, wherein said at least one multifunctional work head is arranged on said base housing, said at least one multifunctional work head capable of being moved vertically up and down relative to said at least one container platform.

16. The laboratory instrument of claim 1, wherein said at least one protective wall including said at least one cutout is vertically movable together with said at least one multifunctional work head.

17. The laboratory instrument of claim 1, wherein said at least one container platform is capable of vertical movement relative to said at least one multifunctional work head.

* * * * *